United States Patent [19]

Grover et al.

[11] 4,395,720

[45] Jul. 26, 1983

[54] CONFIGURATIONAL REDUCTION OF PULSE EJECTOR CROSSTALK

[75] Inventors: Joel W. Grover, Rochester, N.Y.; Kenneth H. Fischbeck, Dallas, Tex.

[73] Assignee: Xerox Corporation, Stamford, Conn.

[21] Appl. No.: 306,794

[22] Filed: Sep. 29, 1981

[51] Int. Cl.$^3$ .............................................. G01D 15/18

[52] U.S. Cl. .................................. 346/140 R; 346/1.1

[58] Field of Search ........... 346/75, 1, 140 IJ, 140 PD

[56] References Cited

U.S. PATENT DOCUMENTS

| | | | |
|---|---|---|---|
| 4,010,477 | 3/1977 | Frey | 346/75 |
| 4,025,925 | 5/1977 | Jensen et al. | 346/75 |
| 4,063,254 | 12/1977 | Fox et al. | 346/75 |
| 4,091,390 | 5/1978 | Smith et al. | 346/75 |
| 4,219,822 | 8/1980 | Paranjpe | 346/75 |
| 4,251,823 | 2/1981 | Sagae | 346/140 IJ |
| 4,300,144 | 11/1981 | Isayama et al. | 346/140 PD |
| 4,364,060 | 12/1982 | Jinnai et al. | 346/75 |

*Primary Examiner*—George H. Miller, Jr.
*Attorney, Agent, or Firm*—Richard A. Tomlin

[57] ABSTRACT

A method of minimizing crosstalk between transducer driven pulse liquid droplet ejectors in ejector arrays. An array mounted on a scanning carriage and having nozzles inclined to the direction of relative motion between the carriage and the print-receiving member is designed such that adjacent nozzles are not fired simultaneously. Similarly, an oscillating bar pulse ejector array is designed such that adjacent nozzles are not fired simultaneously.

3 Claims, 5 Drawing Figures

CONFIGURATIONAL REDUCTION OF PULSE EJECTOR CROSSTALK

The invention relates in general to pulsed liquid droplet ejecting systems in which closely spaced arrays of droplet ejecting jets are used. Specifically, the invention relates to a method of minimizing "crosstalk" between jets in an array of jets by designing the array nozzle spacing such that adjacent nozzles are not required to be fired simultaneously or near simultaneously.

In a pulsed liquid droplet ejecting system, such as an ink jet printer, transducers are used to cause expulsion of ink as droplets from a small nozzle or jet. An array of such jets is often utilized in high-speed, high-resolution printers. As is well known, the rate of printing and the resolution of the printed image depend on the number of such jets and their spacing. The closer the jets are to each other in general, the faster the images can be produced and with higher image resolution. It has been found, however, that when the jets are very close to one another in an array, the response of one jet to its drive pulse can be affected by whether other jets located nearby in the same array are also operating. For example, it has been found in one system where the ink jet nozzles are located on 50 mil centers that when adjacent jets are fired together, the velocity of the drops may be increased by as much as 10%. Where three side-by-side jets are fired simultaneously, the velocity increase can be as much as 20%. This velocity variation causes drop placement errors and can affect image quality. To avoid such crosstalk, it is desired that there be a time interval between the firing of adjacent jets sufficient to allow the system to settle down or stabilize enough not to affect the operation of an adjacent jet. The arrays of this invention are designed such that adjacent nozzles are not required to operate simultaneously.

The advantages of the present invention will be better understood on consideration of the following description, particularly when taken in conjunction with the drawing wherein.

Figure 1:
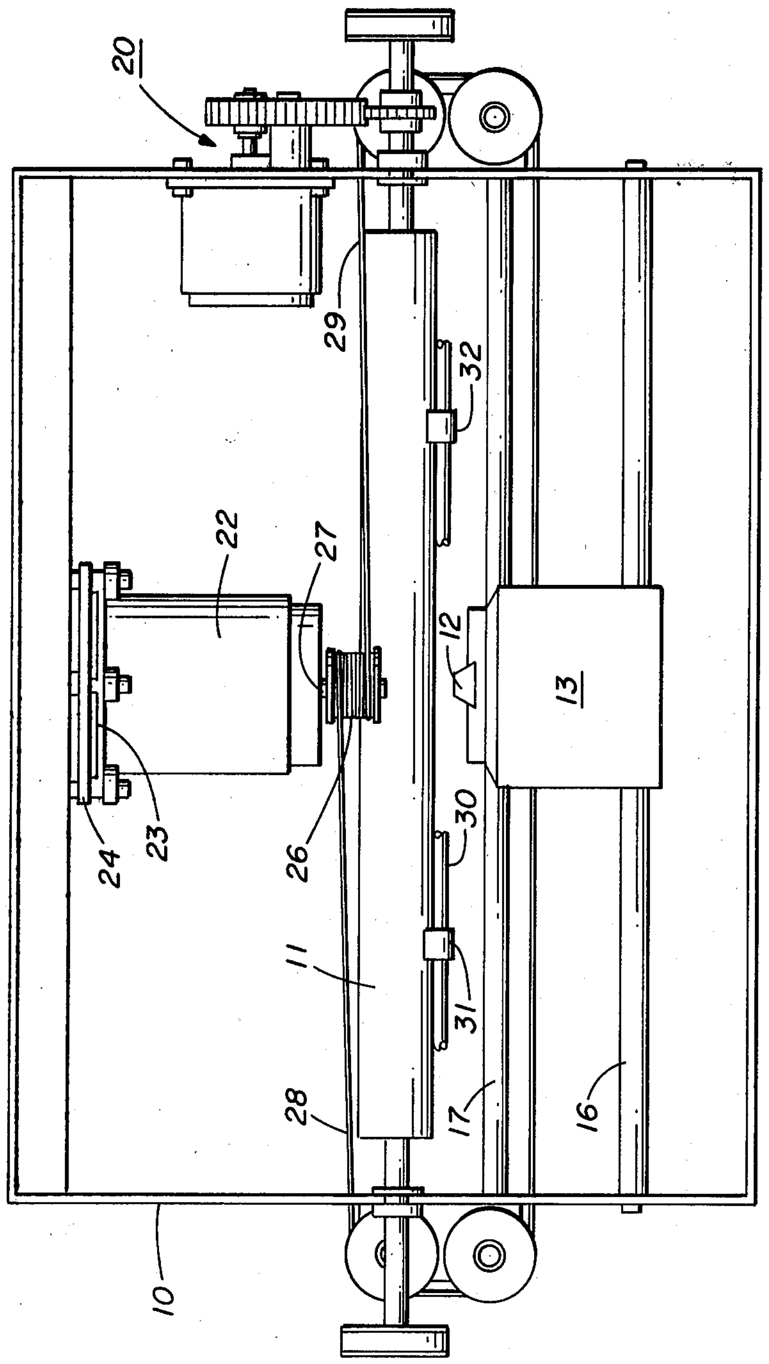
FIG. 1 is a top plan view of a typical scanning carriage printer in which the present invention could be incorporated.

Referring now to FIG. 1, an overall plan view of a typical ink jet scanning carriage printer is illustrated contained within frame 10. The printer includes a platen or roller 11, which carries the paper or other record medium (not shown). The record medium is printed on by an ink jet droplet emitter 12 carried by carriage 13. The means for providing ink, the electrical signal and the transducers for emitting droplets are not shown, being well known and conventional. For example, a scanning carriage ink jet printer is available commercially from Siemens.

Figure 2:
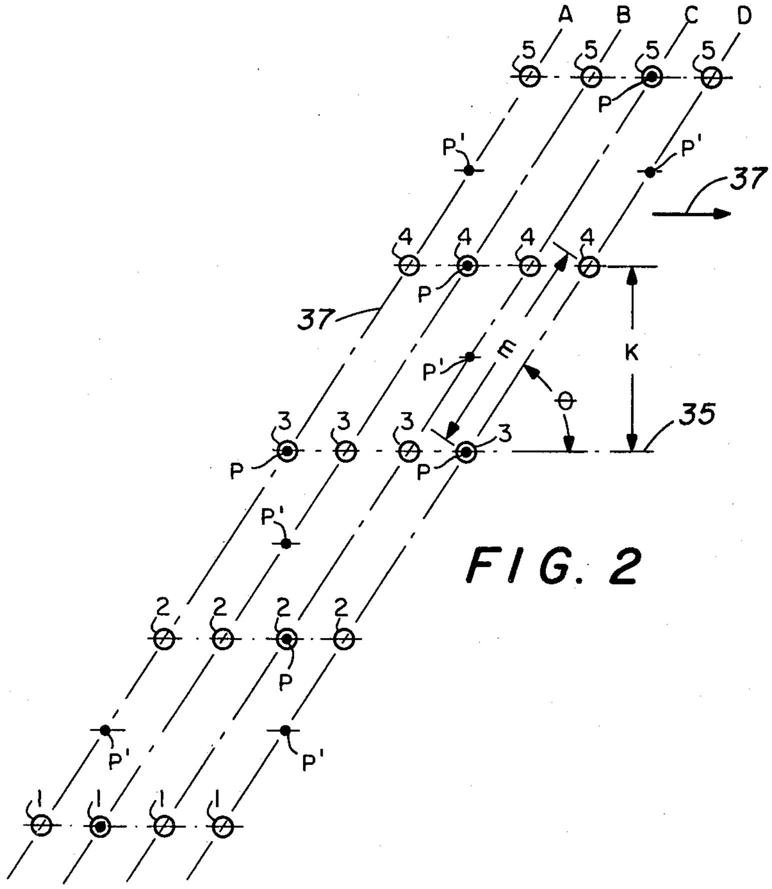
FIG. 2 is a diagram showing in greater detail the inclined relationship between the array nozzles and the data points or pixels for the scanning carriage printer of FIG. 1.

Ink jet droplet emitter 12 is carried along a predetermined line of printing 35 in FIG. 2, along platen 11, by carriage 13. The carriage 13 is mounted for reciprocating linear movement on rails 16 and 17. Carriage 13 is transported from right to left or left to right continuously while printing occurs. The transport is provided by a motor 22, which may be either a servo motor or a stepping motor. For example, motor 22 may be part of a servo control system. In such a system, a rotary disc 23 is mounted on motor shaft 27 adjacent a fixed disc 24. As discussed in U.S. Pat. No. 3,954,163, a series of parallel radial metal conductors is present on the discs and provides position signals for the servo system.

A pulley 26 is also mounted on motor shaft 27. Motor 22 drives carriage 13 by cable segments 28 and 29. The motor 22, in conjunction with the pulley 26 and cable segments 28 and 29, serves to transport the carriage from a center position, in which it is shown, to extreme left and right positions. Vertical paper feed assembly 20 and record member bail 30 and bail rollers 31 and 32 are also provided.

Referring now to FIG. 2, there is shown ink jet nozzles 1–5 aligned on the face of ink jet droplet emitter 12 (see FIG. 1). These nozzles are inclined at an angle in relation to a predetermined line of printing 35, which, in this exemplary instance, is a horizontal line, which is parallel to the axis of the platen 11. It can be seen that a center line 37 drawn through the ink jet nozzles forms an angle $\theta$ with respect to the predetermined line of printing 35. The black dots indicated as "p" to "p'''" are the predetermined potential data points or pixels. The array of ink jet nozzles 1–5 is spaced such that as the array moves from positions A-D in the direction shown by arrow 37, the nozzles 1–5 line up with the pixels p as follows: In position A, nozzle 3 could be fired if it were desired to place an ink droplet on the associated pixel. At position B, nozzles 1 and/or 4 could be fired. At position C, nozzles 2 and/or 5 could be fired. At position D, nozzle 3 has again aligned with a pixel, and if an ink droplet were desired by the data input, the jet could be fired providing a droplet at that point. This diagram, for simplicity and ease of understanding, ignores the droplet positional offset that results from the movement of the scanning carriage. If desired, the points indicated by p could more accurately be considered representative of the point at which droplets are caused to be expelled from the nozzles 1–5.

It can be seen that m, the distance between nozzles, and $\theta$, the angle formed by the centerline of the nozzles 1–5 and the predetermined line of printing 35, are chosen so that m sin $\theta$ equals the vertical distance between a whole number of pixels. In the exemplary instance shown in FIG. 2, m sin $\theta = K = 2$ or two pixel distances. Furthermore, the horizontal spacing between nozzles, which is equal to m cos $\theta$, is chosen to be a distance given by l/n pixels, where l and n are integers having no common factors, and n is not equal to one. In FIG. 2, l = 4 and n = 3. With this arrangement, every nth jet fires at the same time. Since in this ink jet array adjacent jets do not fire simultaneously, the jet nozzles 1–5 may be constructed closer together without incurring crosstalk. Here, there are two non-triggered nozzles, for example, nozzles 3 and 4, in position C, between the fired nozzles, nozzles 2 and 5, which would indicate that these nozzles can be placed at intervals one-third the interval of simultaneously addressed adjacent nozzles for an equivalent degree of crosstalk. Since each nozzle 1–5 is or can be fired as it crosses its associated pixels, no throughput is lost by having the adjacent nozzles not fired simultaneously. That is, the scanning carriage 13 can be moved relative to platen 11 as fast as if the adjacent nozzles were fired simultaneously. Assuming carriage 13 has completed its traverse of platen 11 in the direction indicated by arrow 37, vertical paper feed assembly 20 is activated causing the array to drop as shown in FIG. 2 one vertical pixel distance relative to the record surface. On the return traverse, that is, when the carriage 12 is scanning from right to left, the nozzles 1–5 will now be aligned with the row of pixels p' shown in FIG. 2 between the nozzles 1–5. This is, of course, but one example of the possible scanning patterns that could be utilized. For example, it may be desirable to have scanning carriage 12 retraverse the same row of pixels one or more times to, for example, increase image density. Also, nozzles 1–5 may be separated an equivalent vertical distance of one or more pixel distances. The embodiment shown in FIG. 3 is quite different but utilizes the same principle.

Figure 3:
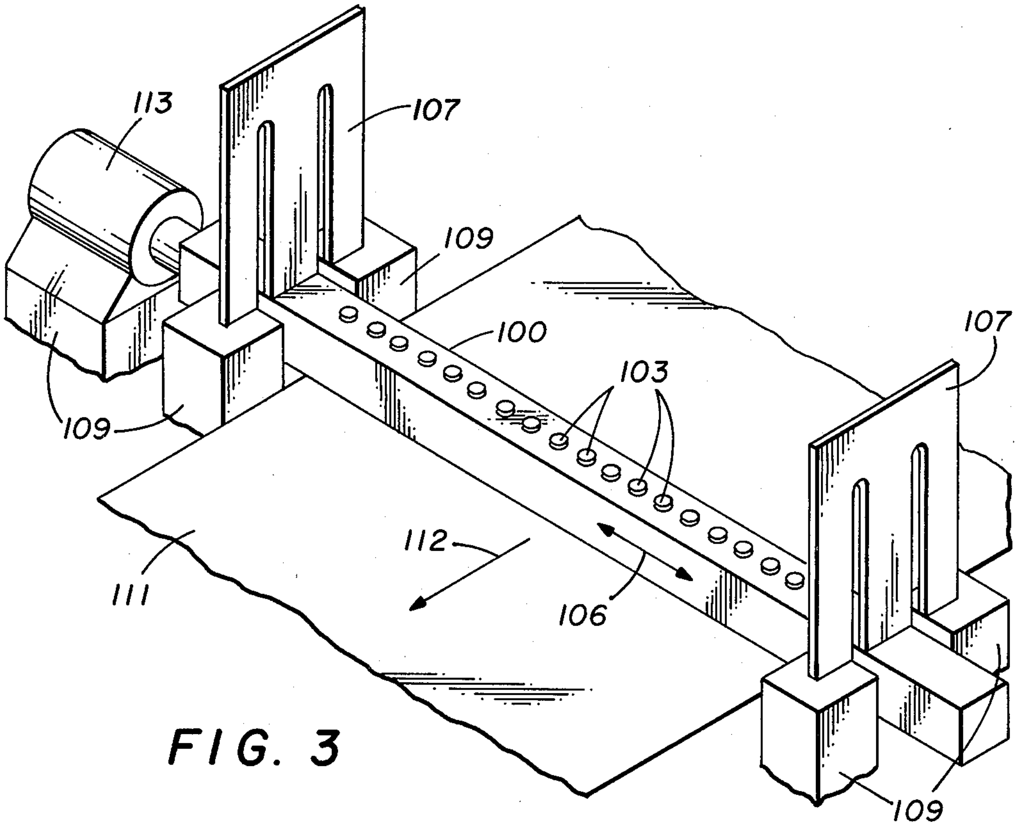
FIG. 3 is a perspective view of an oscillating bar printer, which incorporates a second embodiment of the present invention.

Referring now to FIG. 3, there is shown a raster input scan/raster output scan (RIS/ROS) support member 100, which may be, for example, of a plastic material. Supported on RIS/ROS support member 100 are scanning/reading means represented here by discs 103, which may be, by way of example, photodetectors. Also supported on RIS/ROS support member 100 are marking elements 105 (see FIG. 4), which, in this exemplary instance, are again drop-on-demand ink jets. Conveniently, one marking element can be provided for each reading element; however, obviously this is not necessary. RIS/ROS support member 100 is suspended for axial oscillatory movement in the directions shown by arrow 106 by flexure mounts 107, which act as multiple compounded cantilever springs. This double-pivoting action keeps support member 100 in spaced relationship to record-receiving member 111 and document to be read 115 (see FIG. 4) during its complete travel. Support member 100 is oscillated by oscillating means 113, which may be, for example, a solenoid. Solenoid 113 is also fixed to base 109.

In addition to the oscillation of RIS/ROS support member 100, it is necessary to provide relative movement between member 100 and the document to be read 115 (see FIG. 4) and/or the record-receiving member 111. The relative movement is at right angles, that is, orthogonal, as shown by arrow 106, which represents the axial oscillation of RIS/ROS support member 100 and arrows 112, which represent the motion of record-receiving member 111 and document 115. It should be noted that RIS/ROS support member 100 scans rapidly in comparison with the velocity of movement of document 115 and/or record-receiving member 111. Typical means for moving document to be read 115 and record-receiving member 111 is shown in FIG. 4.

Figure 4:
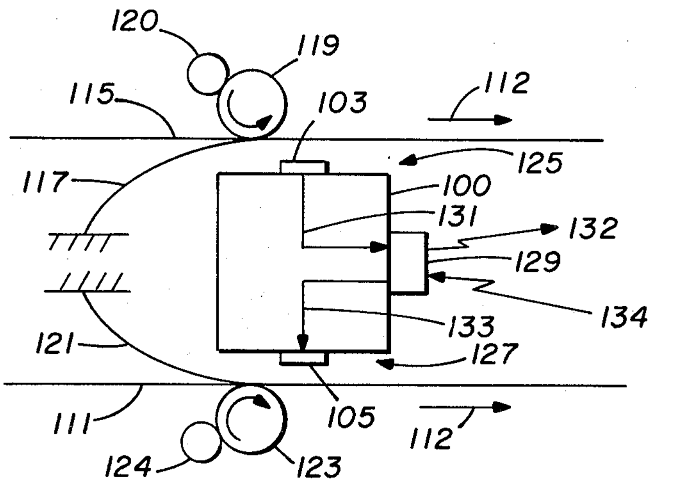
FIG. 4 is a side-sectional view of the oscillating bar printer of FIG. 3.

Referring now to FIG. 4, which represents a simplified side-sectional view of FIG. 3, document 115, which is to be read, is guided by leaf-spring fingers 117 into contact with drive guide roller means 119, which, when driven by motor 120, pulls document 115 across the reading path of photodetectors 103 through image-reading station designated generally as 125. Document 115 and roller 119 are not shown in FIG. 3 to simplify understanding of the construction of RIS/ROS support member 100. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Controller 129 is used to receive the input signal 131 from the photodetectors 103 and to produce an output signal 133 to ink jets 105. Controller 129 is conveniently mounted on oscillating RIS/ROS support member 100.

Where the graphic engine is to be used as a copier, a document to be copied 115 and a copy sheet 111 are fed into the nip formed by leaf-spring fingers 117 and drive roller 119, and leaf-spring fingers 121 and drive roller 123, respectively. Solenoid 113 is activated causing RIS/ROS support member 100 to oscillate axially a distance approximately equal to the distance between photodetectors 103 to ensure that all areas of document 115 are read or scanned by photodetectors 103. Drive roller motors 120 and 124 are activated causing rotation of rollers 119 and 123 in such manner that document 115 and record-receiving member 111 are advanced at about the same speed in synchronization. The document 115 and copy 111 may be advanced either stepwise or continuously. As document 115 is advanced, it is scanned by photodetectors 103, which send signals 131 to controller 129. Controller 129, in response to input signals 131, provides output signals 133, which trigger the appropriate ink jets 105. In this manner, a copy is formed on sheet 111 corresponding to the document 115. Obviously, signals 131 could be provided from a remote source, for example, facsimile or computer devices in which case the photodetectors 103, document 115 and associated document feed apparatus would not be required.

Figure 5:
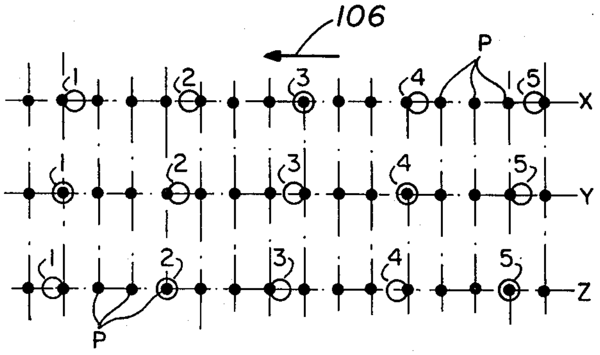
FIG. 5 is a diagram showing in greater detail the relationship between the ink jet nozzles and the data points or pixels of the present invention for the oscillating bar printer of FIG. 3.

In either event, ink jet 105 nozzles 1–5 shown in FIG. 5 can be spaced so that no two adjacent jets are located over their associated potential firing location or pixel p at the same instance. The principle to be applied is to choose the horizontal spacing of jets addressing the same horizontal line of pixels to be 1/n pixels, where 1 and n are integers having no common factors, and n is not equal to one. As shown in FIG. 5, the nozzles are spaced three and one-third pixel intervals apart. Therefore, in FIG. 5, 1 has been chosen to be 10, and n has been chosen to be 3. Again, every nth (in this case every third) jet will fire simultaneously as will now be described. FIG. 5 shows how the nozzles line up with their associated potential pixel points p as the array is moving in direction 106. At position X, nozzle 3 is in a position to be fired. As the array moves further to the left as seen in FIG. 5, it arrives at a position as represented by row Y. Here nozzles 1 and 4 may be fired if data input signals 131 (see FIG. 4) call for a dot to be printed on their associated pixel(s). As the array moves further to the left, jet nozzles 2 and 5 may be fired. Here, there are two nozzles that are not addressed by a signal 131 between the two addressed nozzles. This means that the jets can be positioned one-third as close to each other as if all adjacent jets were addressed simultaneously. The array of jets can be oscillated further in the direction 106, as seen in FIG. 5, if desired so that each jet nozzle 1–5 can provide more than a single pixel p, or the array can be oscillated back to the right to position Y and then to position X if desired. The fact that one nozzle, for example nozzle 4, might be required to fire more often than, say, nozzles 3 and 5, does not affect system throughput.

Although specific components have been disclosed herein, many modifications and variations will occur to those skilled in the art. Such modifications and variations are intended to be included within the scope of the appended claims. For example, the reading elements could be charge couple devices, thin film deposits, magnetic pickups and other well-known devices.

What is claimed is:

1. A method of minimizing crosstalk between transducer driven pulsed liquid droplet ejectors in an ejector array comprising:

(a) providing a predetermined regularly spaced set of potential pixel locations on a predetermined line of printing;

(b) providing an array of regularly spaced pulsed liquid droplet ejectors in a row, said ejectors being spaced in said array such that no two adjacent ejectors are aligned with said pixel locations at the same time; and (c) addressing said pulsed liquid droplet ejectors only when said ejectors are aligned with a pixel location.

2. A method of minimizing crosstalk between transducer driven pulsed liquid droplet ejectors in an ejector array comprising:

(a) providing a predetermined regularly spaced set of potential pixel locations in at least two parallel rows, said rows being aligned along a predetermined line of printing and spaced apart a predetermined distance;

(b) providing an array of regularly spaced pulsed liquid droplet ejectors aligned in a row, said array being inclined at an angle $\theta$ with respect to the predetermined line of printing and said ejectors being spaced apart from each other a distance m, wherein m satisfies the equations:

$$m \sin \theta = K \text{ pixels}$$

and $$m \cos \theta = 1/n \text{ pixels}$$

and wherein K, 1 and n are integers; 1 and n having no common factors, and 1 and n not being equal to one; and (c) scanning said array along said predetermined line of printing while addressing said pulsed liquid droplet ejectors only when said ejectors are aligned with a potential pixel location.

3. A method of minimizing crosstalk between transducer driven pulsed liquid droplet ejectors in an array comprising:

(a) providing a predetermined regularly spaced set of potential pixel locations on a predetermined line of printing;

(b) providing an array of regularly spaced pulsed liquid droplet ejectors aligned in a row over the said pixel locations, said array having ejectors spaced 1/n pixels apart, 1 and n being integers having no common factors, and n not being equal to 1; and (c) scanning said array long said row of pixels while addressing said pulsed liquid ejectors only when said ejectors are aligned with a potential pixel location.

* * * * *